US011185903B2

United States Patent
Angerer et al.

(10) Patent No.: US 11,185,903 B2
(45) Date of Patent: Nov. 30, 2021

(54) BENDING MACHINE HAVING A WORKING AREA IMAGE CAPTURING APPARATUS AND METHOD FOR IMPROVING THE OPERATIONAL SAFETY OF A BENDING MACHINE

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Verena Steininger, Linz (AT); Helmut Theis, Pfarrkirchen (AT); Manfred Waldherr, Linz (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 512 days.

(21) Appl. No.: 16/327,110

(22) PCT Filed: Aug. 30, 2017

(86) PCT No.: PCT/AT2017/060212
§ 371 (c)(1),
(2) Date: Feb. 21, 2019

(87) PCT Pub. No.: WO2018/039696
PCT Pub. Date: Mar. 8, 2018

(65) Prior Publication Data
US 2019/0210083 A1    Jul. 11, 2019

(30) Foreign Application Priority Data

Sep. 2, 2016 (AT) .............................. A 50784/2016

(51) Int. Cl.
*B21D 5/02* (2006.01)
*G06T 7/00* (2017.01)

(52) U.S. Cl.
CPC .................. *B21D 5/02* (2013.01); *G06T 7/00* (2013.01); *G05B 2219/31048* (2013.01);
(Continued)

(58) Field of Classification Search
None
See application file for complete search history.

(56) References Cited

U.S. PATENT DOCUMENTS 5,856,860 A    1/1999  Bhalakia et al.
9,296,029 B2   3/2016  Sperrer
(Continued)

FOREIGN PATENT DOCUMENTS

AT    508 310 A1    12/2010
AT    510 950 A2    7/2012
(Continued)

OTHER PUBLICATIONS

International Search Report in PCT/AT2017/060210, dated Feb. 1, 2018.
(Continued)

*Primary Examiner* — Sean Shechtman
(74) *Attorney, Agent, or Firm* — Collard & Roe, P.C.

(57) ABSTRACT

A bending machine with a work area image capture apparatus has a machine frame, a longitudinally extended, fixed machine table, and a longitudinally extended press beam moved by a drive relative to the frame and guided therein. The longitudinal expanse and the press beam movement direction define a working plane establishing a front working and manipulation space and a rear machine space. An image capture apparatus above the machine table in the machine space has a capture region oriented toward the
(Continued)

machine space and is connected with a display configured to represent the captured image of the capture region. The capture apparatus is connected with the display by an image processing processor having a coordinate transformation module configured the captured image perspective. The coordinate transformation module is connected with a wireless position determination system configured to determine the machine operator position in the working and manipulation space.

20 Claims, 4 Drawing Sheets

(52) U.S. Cl.
CPC ........... *G05B 2219/32001* (2013.01); *G05B 2219/45143* (2013.01); *G05B 2219/45234* (2013.01)

(56) References Cited

U.S. PATENT DOCUMENTS

| | | | |
|---|---|---|---|
| 9,415,477 | B2 | 8/2016 | Tauchmann et al. |
| 9,547,300 | B2 | 1/2017 | Angerer et al. |
| 9,561,571 | B2 | 2/2017 | Wielens et al. |
| 2008/0258888 | A1 | 10/2008 | Kubota et al. |
| 2013/0289760 | A1 | 10/2013 | Angerer et al. |
| 2014/0132720 | A1 | 5/2014 | Rogers et al. |
| 2014/0292805 | A1 | 10/2014 | Kamada et al. |
| 2017/0102796 | A1 | 4/2017 | Rogers et al. |
| 2017/0115656 | A1* | 4/2017 | Ottnad ............... B23K 26/0876 |

FOREIGN PATENT DOCUMENTS

| | | |
|---|---|---|
| AT | 511 557 A1 | 12/2012 |
| CN | 102218458 A | 10/2011 |
| CN | 103329054 A | 9/2013 |
| CN | 204247811 U | 4/2015 |
| DE | 10 2008 014 869 A1 | 9/2009 |
| DE | 10 2010 016646 A1 | 11/2010 |
| EP | 2 590 040 B1 | 5/2013 |
| EP | 2 639 012 B1 | 9/2013 |
| JP | H01271012 A | 10/1989 |
| JP | H04-313424 A | 11/1992 |
| JP | 2001-025823 A | 1/2001 |
| JP | 2004-017072 A | 1/2004 |
| JP | 2004-025237 A | 1/2004 |
| JP | 2004-202506 A | 7/2004 |
| JP | 2005-021978 A | 1/2005 |
| JP | 2006-061958 A | 3/2006 |
| JP | 2006-297469 A | 11/2006 |
| JP | 3908097 B2 | 4/2007 |
| JP | 2008-099201 A | 4/2008 |
| JP | 4743688 B2 | 8/2011 |
| JP | 2014-502561 A | 2/2014 |
| JP | 2014-065060 A | 4/2014 |
| JP | 2014-197818 A | 10/2014 |
| JP | 2016-500027 A | 1/2016 |
| JP | 5856860 B2 | 2/2016 |
| JP | 2016-043373 A | 4/2016 |
| JP | 2016-090790 A | 5/2016 |
| JP | 2016-129898 A | 7/2016 |
| WO | 03/035294 A1 | 5/2003 |

OTHER PUBLICATIONS

International Search Report in PCT/AT2017/060211, dated Jan. 24, 2018.

International Search Report in PCT/AT2017/060212, dated Feb. 1, 2018.

* cited by examiner

BENDING MACHINE HAVING A WORKING AREA IMAGE CAPTURING APPARATUS AND METHOD FOR IMPROVING THE OPERATIONAL SAFETY OF A BENDING MACHINE

CROSS REFERENCE TO RELATED APPLICATIONS

This application is the National Stage of PCT/AT2017/060212 filed on Aug. 30, 2017, which claims priority under 35 U.S.C. § 119 of Austrian Application No. A 50784/2016 filed on Sep. 2, 2016, the disclosure of which is incorporated by reference. The international application under PCT article 21(2) was not published in English.

The invention relates to a bending machine having a work area image capture apparatus.

The work area or field of vision of a machine operator of a bending machine, specifically an air bending machine, is dominated by the machine table and, above all, by the press beam, based on the design. In particular, the press beam, with the bending tools disposed on it, greatly restricts the view into the machine interior, where the rear stop apparatus with the contact fingers is situated, in most cases. Furthermore, it is usual to dispose several different types of bending tools on the press beam, so as to thereby be able to perform different bending transformations along the press beam. For this purpose, the machine operator must supply the workpiece to be formed to the bending tools in the correct sequence and with the correct orientation, in each instance.

If a bending machine is used for series production of a greater number of workpieces to be processed in the same way, the machine operator is already well familiar with the individual work steps and will therefore reliably perform the operating actions, in particular correctly oriented feed of the workpiece.

In the case of smaller numbers of items to be produced in series, in particular in the case of a number tending toward one, a machine operator does not have the necessary routine, and this brings with it the risk that a workpiece will be bent incorrectly, in particular in the case of complex bent parts. Since a machine operator must coordinate and monitor the most varied actions, in part almost simultaneously, in particular correct orientation at the correct bending station and correct contact of the workpiece with the rear stop, an unnecessarily high level of stress is caused by this. Since the rear stop, in particular, generally cannot be seen directly due to the design conditions of the bending machine, the machine operator must bend over so as to be able to check that the workpiece lies against the rear stop when it is inserted, and this brings with it not only additional physical stress but also a risk of injury, due to the sharp-edged metallic sheet-metal parts.

During proper operation of a bending machine, the machine operator is required to perform control tasks and monitoring tasks that require attention at different locations, some of which are spaced far apart from one another, at the same time, to the greatest possible extent. At the same time, it is necessary to take orientation processes of the workpiece to be formed, some of which processes are complex, into account.

For example, EP 2 590 040 B1 discloses a bending machine, in the case of which two cameras are disposed on the press beam, which cameras capture the front work area of the bending machine, in particular a workpiece to be formed that has been inserted, and wherein after determination of the orientation of the workpiece, orientation information is projected onto the workpiece by a projector. In this regard, the two cameras are disposed in the end regions of the press beam and in front of the press beam. However, placement of elements such as a camera or a projector in front of the press beam has a further decisive disadvantage, in that a great risk of damage exists for objects disposed in this manner. Sheet-metal parts are often supplied to the bending machine using an indoor crane, and this can easily lead to damage to apparatuses disposed in front of the press beam.

Also, the metal sheet can make contact with the press beam as it bends upward, and damage apparatuses affixed there.

A metal sheet insertion aid is known from JP 5856860 B2, in which a camera in the machine space is directed at the rear stop and the inserted metal sheet. In the captured image, a sheet-metal edge or a distinctive point of the metal sheet is determined and compared with a reference position. In the event of a deviation, a projector projects a marking onto the metal sheet, and the metal sheet must be oriented relative to this marking, with reference to the rear stop. The camera and the projector are affixed to an apparatus that can be moved parallel to the press beam.

From the prior art, it is known to record the area in front of a bending machine and also the area behind the press beam, using an image capture means. It is disclosed that the captured image is shown on a display means, wherein a correction of the representation on the basis of changing position conditions between operator, bending machine, workpiece to be formed, and work position does not take place. The same perspective representation is therefore always displayed to the machine operator, independent of the operator's current position. This in turn increases the risk of error, since the user once again needs to coordinate his/her position with his/her viewing direction and the image shown, so as to be able to correctly understand the situation being shown. Specifically in the case of wide bending machines (press beam having a length of several meters), clear distortions of perspective can occur.

The task of the invention therefore lies in improving the disadvantages of the state of the art and in creating a bending machine in the case of which a machine operator in the work area in front of the bending machine always has an essentially unhindered perspective of the rear machine space provided to him/her, without the machine operator himself/herself having to interpret the representation anew.

The task of the invention is accomplished by a bending machine having a work area image capture apparatus. The bending machine has a machine frame, a longitudinally extended machine table, fixed in place, and a longitudinally extended press beam, which press beam is guided in the machine frame and held by a drive means, so as to be movable relative to the latter, and wherein the drive means is controlled by a machine controller. The machine frame furthermore has two side parts, which are spaced apart from one another by a machine width in the direction of the longitudinal expanse of the machine table, and wherein the longitudinal expanse and the movement direction of the press beam define a working plane. The working plane establishes a front working and manipulation space and a rear machine space, which is distinguished from the former and, in particular, closed off. An image capture apparatus is disposed in the machine space, above the machine table, wherein a capture region of the image capture apparatus is oriented in the direction of the machine space. The image capture apparatus is connected with a display means, which is configured for representation of the captured image of the capture region. The image capture apparatus is connected with the display means by way of an image processing processor; furthermore, the image processing processor has a coordinate transformation module that is configured for correction of the perspective of the captured image. The coordinate transformation module is connected with a wireless position determination system, which is configured for determining the position of a machine operator in the working and manipulation space.

The advantage of the present embodiment lies in that the machine operator can look into the rear, closed-off machine space without physical contortions, wherein the representation is adapted to the current position of the machine operator. As a result, the machine operator has a correct view, in terms of perspective, also of the machine interior, from every position in the area in front of the machine.

A further development consists in that the image capture apparatus is formed by at least a 2D or 3D camera, for example by a CCD camera. This is advantageous because such cameras are easily and cost-advantageously available.

According to a further development, it is also provided that the position determination system has a mobile part carried by the machine operator and a first counter-location disposed on the bending machine, wherein a wireless high-frequency communication connection exists between the mobile part and the first counter-location, and that the bending machine has at least a second counter-location, wherein a wireless ultrasound signal connection exists between the mobile part and the at least one wide second counter-location. The position of the machine operator in relation to the bending machine can therefore be determined at all times, so that the perspective correction of the display can also take place essentially in real time. An example of a position-locating system in accordance with the claim is known from AT 510 950 A2.

A further development consists in that the image capture apparatus is disposed in a center section of the longitudinal expanse of the press beam or in the region of at least one of the side parts. A particularly good view of the machine interior is provided in the center section of the press beam, due to the central position. The image capture apparatus can be disposed in particularly well protected manner in the region of the side parts.

A further development according to which a graphic model of the bending machine is stored in memory in a memory means of the image processing processor or in an external memory means connected with the image processing processor, which model the image processing processor shows on the display means, superimposed on the captured image, is also possible. In this way, it is possible to show relevant components of the bending machine in the representation on the display means, without an image analysis having to be carried out in the image captured by the image capture apparatus for this purpose. By having knowledge of the placement of the image capture apparatus with reference to the bending machine and of the optical characteristic data of the image capture apparatus, it is possible to overlay elements from the stored model of the bending machine onto the representation on the display means, by means of coordinate transformation. The external memory can be formed by a central database, for example.

According to a further development, it can also be provided that a further image capture apparatus connected with the image processing processor is disposed in the working and manipulation space, which apparatus has a capture region that is oriented relative to the area of the head height of a machine operator, and wherein the further image capture apparatus is connected with the face-finding module of the image processing processor.

As a result, the precise height of the eyes of the operator can be determined, and thereby the perspective representation on the display means can be very precisely adapted to the actual field of vision of the operator. For the operator, a representation is therefore created as if the bending machine, in particular the press beam, were transparent.

A further development also consists in that the display means is formed by a projector, wherein the projection region is oriented relative to a front side of the bending machine, particularly the press beam or a casing of the press beam. This further development makes use, in advantageous manner, of existing surfaces of the bending machine as a projection surface. Since these are generally oriented vertically, to the greatest extent, and the operator's view is also generally directed at the bending machine, the display means is therefore situated quite well in the direct field of vision of the operator. In an alternative embodiment, it is also possible that the projection region is oriented relative to a section of the surface of the metal sheet to be formed. This embodiment has the advantage that the projection region is situated in the area of the main attentiveness of the machine operator. During bending, the machine operator will generally pay attention to the metal sheet to be formed and to the bending line or the bending tools coming down. Since the projection surface is now situated in this area, the operator will not be distracted from his/her work, or only distracted slightly, by looking at the projected information.

A further advantageous further development also consists in that the display means is formed by data glasses. Because of the placement of the glasses on the user's head and precisely in the field of vision of the wearer, it is guaranteed that the machine operator is presented with relevant information precisely in his/her field of vision, independent of the current viewing direction.

To this effect, a further possible embodiment is advantageous, according to which the mobile part is formed by the data glasses. Since the position of the operator is now determined by means of the data glasses, the representation can be corrected very well in terms of perspective. In a further development, it can be provided that the data glasses only also determine an orientation of the head, so that a representation is only overlaid when the operator is looking at the bending machine.

A further advantageous embodiment consists in that the image capture apparatus is disposed on a manipulation apparatus that is configured to change the position of the image capture apparatus parallel to the longitudinal expanse and/or is configured to pivot the image capture apparatus about a vertical and/or horizontal axis. In this way, it becomes possible to move the image capture apparatus closer to the area of the bending machine of which an image is to be captured. For example, a bending machine can have a width of several meters, and therefore the relative resolution in the sections farthest away from the image capture apparatus decreases. A disadvantageous picture-taking situation can be improved by means of a change in the placement of the image capture apparatus.

According to a further development, it is provided that the wireless position determination system has an acceleration sensor or a recognition mark that can be read in contact-free manner. Changes in location and movements can be well detected with an acceleration sensor, particularly also at high resolution. However, only differential movements and thereby only relative changes in position can be determined with an acceleration sensor, and therefore regular calibrations are required to establish a reference point. A recognition mark, for example an RFID tag, can be structured in such a manner, by means of designing the pulse response of the tag, that a very precise position determination can be achieved by way of a running time measurement of the response of the tag.

A further development also provides that the display means is formed by a flat screen that is disposed on the press beam, in particular on the front side. Due to its slight depth and low weight, a flat screen can easily be affixed in the field of vision of the operator. Also, a flat screen achieves a brightness of the image being shown such that it can be easily recognized even during daylight in a production building. This further development explicitly includes an embodiment variant in which the display means is also formed by more than one flat screen. Depending on the machine width, embodiments are conceivable in which multiple flat screens are disposed along the press beam and together form the display means.

A further advantageous embodiment also consists in that the flat screen is disposed in an installation apparatus, which installation apparatus allows positioning of the flat screen along the longitudinal expanse of the press beam. A bending press generally has a great longitudinal expanse, so that central positioning of the display is advantageous only for bending work in the center region of the bending press. With this further development, the flat screen can be moved along the bending press and, in particular, can be positioned in the immediate vicinity of the bending forming to be carried out. A further embodiment can also consist in that the positioning takes place using a setting means, so that no action by the machine operator is required. The display is then moved to the location of the next bending forming step, in each instance, by the machine controller.

A flat screen is preferably understood to be an active, self-illuminating display, for example a TFT display or an OLED display. However, passive displays can also be used, for example an ePaper display. This has the advantage that reading it is possible without problems even in the case of very bright ambient light.

The task of the invention is also accomplished by means of a method for improving the operating safety of a bending machine, which method is carried out on a bending machine. In real time, a rear image of the machine space is captured by the image capture apparatus, and the coordinates of a machine operator in the working and manipulation space are determined by the position determination system. A transformation vector between the image capture apparatus and the coordinates of the machine operator is determined by the coordinate transformation module, and the captured image is transformed, in terms of perspective, by the image processing processor, using the transformation vector, and the transformed image is shown on the display means.

The particular advantage of this method lies in that the operator is presented, in real time, with a correct representation, in terms of perspective, of the machine space that can only be looked at with physical contortions.

According to a further development, a front image is captured by the further image capture apparatus, in which front image the face of the operator, in particular the position of the eyes, is determined by the face-finding module. From having knowledge of the position of the eyes, the position of the operator in front of the bending machine can be determined more precisely, and thereby from the floor can be determined the perspective correction of the distance of the eyes and a clear improvement in the perspective correction can be achieved in this way.

A possible further development also consists in that a viewing direction vector is determined by the coordinate transformation module from the position of the eyes, which vector is used by the image processing processor, together with the transformation vector, for perspective transformation. Based on the knowledge of the position of the operator in front of the bending machine and the knowledge of the eyes, the representation on the display means can be adapted to the precise viewing perspective of the operator, using the viewing direction vector.

A further advantageous embodiment consists in that a vertical distance between floor and eye position is determined by the coordinate transformation module, from the position of the eyes and a placement position of the further image capture means, which distance is used by the image processing processor for perspective transformation, together with the transformation vector.

The more precisely the viewing direction and thereby the viewing area of the operator can be determined, the more precisely the perspective correction can also be carried out. For precise handling of the workpiece to be formed, in particular its placement against the rear stops, it is important to show the region of the bending machine that cannot be seen on the display means with the correct perspective, if at all possible.

An advantageous further embodiment consists in that the image processing processor shows a reference orientation stored in the memory means or in the external memory means on the display means and/or on a metal sheet inserted into the bending machine. In this way, the operator can be given clear assistance as to how the metal sheet to be formed must be inserted into the bending machine for the next work step. Specifically in the case of small unit numbers, a clear increase in throughput can be achieved in this way, since the operator is not burdened with considerations regarding the correct orientation of the metal sheet. In particular, a reduction in defectively bent workpieces can also be achieved in this way.

According to a further embodiment, it is provided that the image processing processor has a pattern recognition module that captures the orientation of an inserted metal sheet, in particular the outlines of the metal sheet, as the actual orientation in the front and/or rear image, and determines an orientation deviation vector by a comparison with a reference orientation stored in the memory means or in the external memory means, and shows this vector on the display means and/or on the inserted metal sheet as a correction representation. Aside from a pure projection of a reference orientation, it is also possible to recognize an incorrect orientation of the inserted metal sheet and to actively point this out to the operator. For example, it could be provided that an incorrect orientation is shown by means of a signal color, and that an indication of manipulation steps takes place by means of graphic symbols (arrows, direction of rotation, etc.), so as to bring the workpiece into the correct orientation position.

A further advantageous embodiment consists in that the correction representation is generated by the image processing processor as an animation. Specifically in the case of small unit numbers or at the start of a new part to be bent, the machine operator is faced with the challenge of correctly orienting the workpiece between the individual processing steps.

With this further development, the machine operator can be clearly supported during the work sequence, and thereby the risk of defective bent parts can be clearly reduced.

For a better understanding of the invention, it will be explained in greater detail below, using the following figures.

The figures show, each in a greatly simplified, schematic representation:

FIG. 3 a top view of the work area image capture apparatus;

Figure 1:
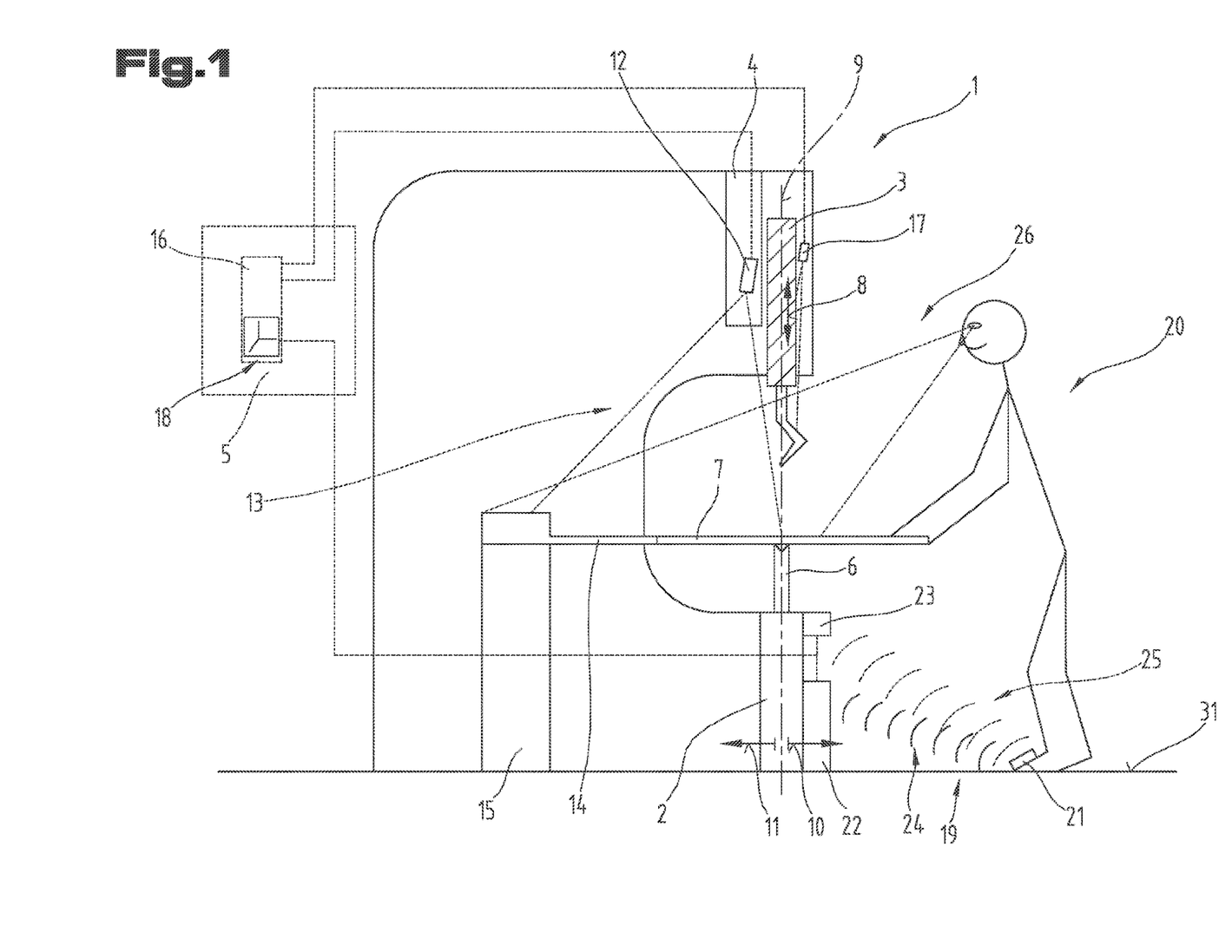
FIG. 1 the present bending machine with a first embodiment of the present work area image capture apparatus.

FIG. 1 shows the present bending machine 1 with a work area image capture apparatus in a sectional representation. The bending machine 1 comprises a machine frame that has a longitudinally extended machine table 2, fixed in place, and a press beam 3, which is also longitudinally extended. The press beam is guided on the machine frame and is moved relative to the frame by drive means 4. In this regard, the drive means 4 is controlled by a machine controller 5, which machine controller 5 moves the press beam 3 so far in the direction of the lower tool 6 disposed on the machine table 2 until the metal sheet 7 laid onto the lower tool 6 was bent by the desired angle.

The longitudinal expanse of the press beam 3 and the movement direction 8 of the press beam 3 define a working plane 9 that establishes a front working and manipulation space 10 and a rear machine space 11, distinguished from the latter. Due to the design elements of the bending machine 1, in particular the press beam 3, the machine space 11 cannot be looked at, or can be looked at only with difficulty. In particular, the machine operator must bend over so as to be able to look at the machine space 11, and this brings with it a clear risk of injury due to sharp edges of the inserted metal sheet 7.

An image capture apparatus 12 is disposed in the machine space 11 and above the machine table 2, which apparatus has a capture region 13, which is oriented in the direction of the machine space 11, in particular the contact fingers 14 of a rear stop 15 disposed in the machine space 11.

The image capture apparatus 12 is connected with a display means 17 by way of an image processing processor 16, which display means 17 is configured for representation of the captured image of the capture region 13. Preferably, the image processing processor 16 is disposed in the machine controller 5 and furthermore has a coordinate transformation module 18, which is configured for correction of the perspective of the captured image of the capture region 13, before the captured image is shown on the display means 17.

Furthermore, it is provided that the coordinate transformation module 18 is connected with a wireless position determination system 19. This system is configured so as to determine the position of a machine operator 20 in the front working and manipulation space 10. According to a preferred embodiment variant, the position determination system 19 has a mobile part 21 carried by the machine operator 20, and a first counter-location 22 disposed on the bending machine 1, preferably on the machine table 2. Preferably, a second counter-location 23 is furthermore disposed on the bending machine 1 or on the machine table 2, wherein a wireless high-frequency communication connection 24 exists between the mobile part 21 and the first counter-location 22, and furthermore a wireless ultrasound connection 25 exists between the mobile part 21 and the second counter-location 23. According to an embodiment variant, the mobile part is formed by a shoe, which allows not only position location by means of the position determination system 19, but also control of the bending machine 1 by the machine controller 5, in particular control of the movement of the press beam 3.

The field of vision 26 of the machine operator 20 relating to the machine space 11 is restricted by the press beam 3 moving down, in particular to the contact fingers 14. With the present embodiment, the machine space 11 is captured by the image capture apparatus 12 and displayed by and/or on the display means 17. However, display takes place taking the determined position of the machine operator 20 into consideration, with a correction of perspective, so that a correct representation of the machine space 11, in terms of perspective, is displayed to the machine operator 20 essentially from every position in the working and manipulation space 10. The machine operator 20 is thereby given the impression that the press beam 3 moving down is not present or is transparent, and does not impair the view into the machine space 11.

Figure 2:
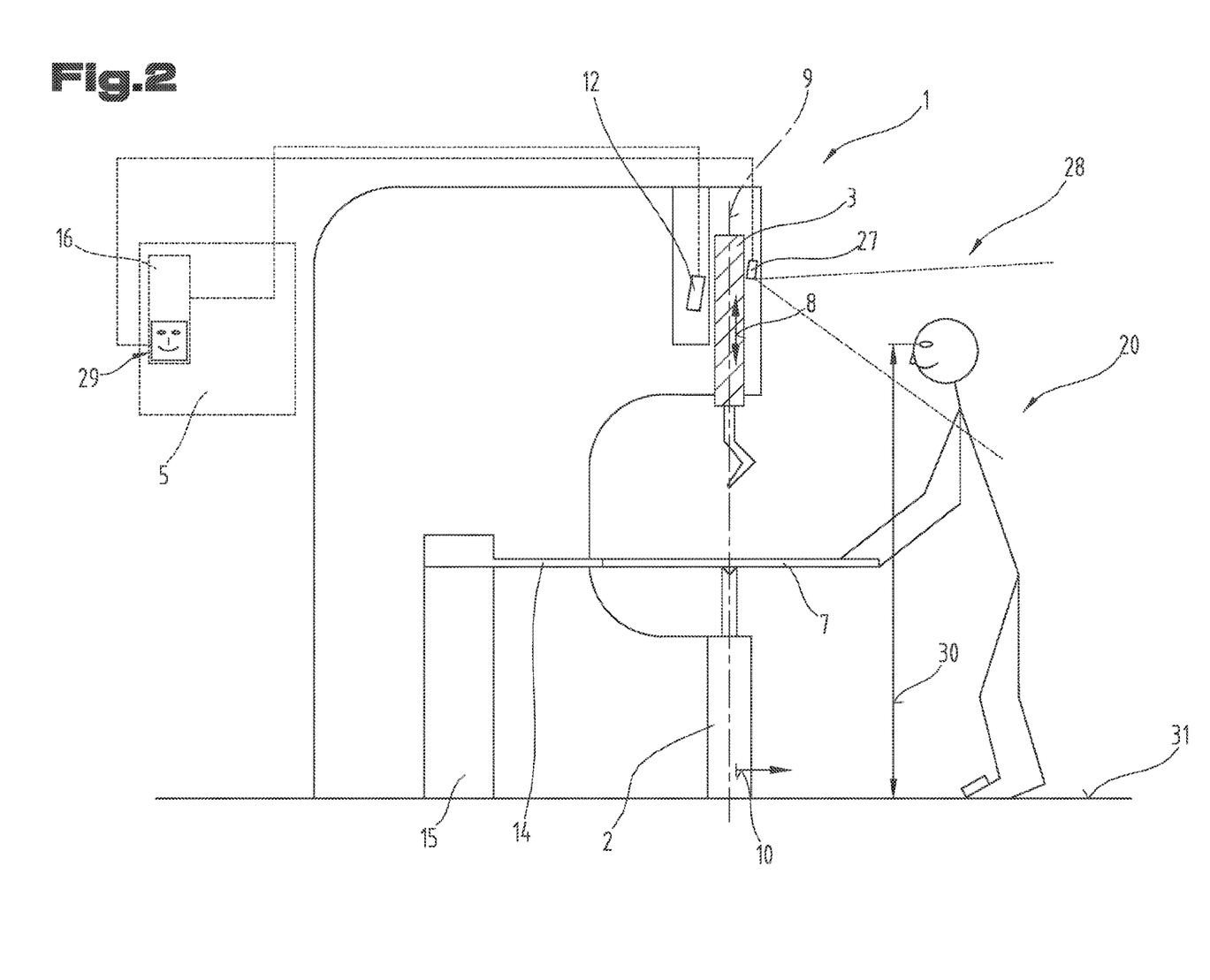
FIG. 2 the present bending machine with a further possible embodiment of the present work area image capture apparatus.

FIG. 2 shows the present bending machine 1 with a further possible embodiment variant of the work area image capture apparatus. In addition, here a further image capture apparatus 27 is disposed in the working and manipulation space 10, which apparatus has a capture region 28 that is oriented relative to the head of the machine operator 20. In this regard, the capture region 28 is selected to be so large that the head position of machine operators 20 of average height lies in the region. For a determination of the eye position, it is provided that the further image capture apparatus 27 is connected with a face-finding module 29 of the image processing processor 16. With this embodiment, the perspective correction of the representation on or by the display means 17 can be clearly improved, since not only the position of the machine operator 20 in the working and manipulation region 10 but also the position of the eyes can be determined. By having knowledge of the position of the further image capture apparatus 27 in relation to the bending machine 1, the vertical distance 30 of the eyes of the machine operator 20 with reference to the base surface 31 can be determined and taken into consideration in the perspective correction.

According to a further advantageous embodiment, a viewing direction vector can be additionally determined from the knowledge of the eye position and of the vertical distance 30, so as to thereby adapt the perspective correction even better or even more precisely to the actual real field of vision 26 of the machine operator 20.

FIG. 3 shows a top view of the present bending machine 1. Two side parts 32 are spaced apart from one another by the machine width 33; between them, the machine table 2 and the press beam 3 are disposed, in the direction of the longitudinal expanse of the machine width 33, wherein the press beam 3 can be moved relative to the machine frame 34 by the drive means 4. The longitudinal expanse and movement direction of the press beam 3 define a working plane 9, which establishes a front working and manipulation space 10 and a rear machine space 11, which generally cannot be looked at or can be looked at only with difficulty.

A rear stop 15 with a contact finger 14 is disposed in the machine space 11, against which stop the metal sheet 7 to be formed is laid and thereby correctly oriented for the bending to be performed.

Since the rear machine space 11, in particular the contact fingers 14 can generally not be seen or seen only with difficulty (in particular by means of bending over) by the machine operator 20 standing in front of the bending machine 1, it is provided that an image capture apparatus 12 is disposed in the machine space 11 and above the machine table 2. In this regard, the image capture apparatus 12 has a capture region 13 that comprises at least the contact fingers 14, in particular the front end of the contact fingers 14, which makes contact with the metal sheet.

The image of the capture region 13, captured by the image capture apparatus 12 and with its perspective corrected by the image processing processor 16, is shown by the display means 17 in a display region 35. This display region 35 is preferably selected in such a manner that it comprises the front side 36 of the press beam and/or a section of the surface 37 of the metal sheet 7 to be formed. Furthermore, it is also possible that the display region 35 is formed, in part, by the floor in front of the bending machine 1.

According to one embodiment, it is provided that the image capture apparatus 12 is disposed in the machine space 11 and above the machine table 2, preferably approximately in the center of the longitudinal expanse of the machine width 33. According to a further embodiment, it is also provided that the image capture apparatus 12 is disposed on a manipulation apparatus 38, which manipulation apparatus 38 is configured for moving the image capture apparatus 12 parallel to the longitudinal expanse of the press beam 3 and/or for pivoting the image capture apparatus 12 about a horizontal and/or vertical axis with reference to the floor.

Likewise, the display means 17 can also be disposed on a manipulation apparatus, not shown, so that it can also be moved parallel to the longitudinal expanse of the press beam 3 or pivoted about a horizontal and/or vertical axis with reference to the floor.

Figure 4:
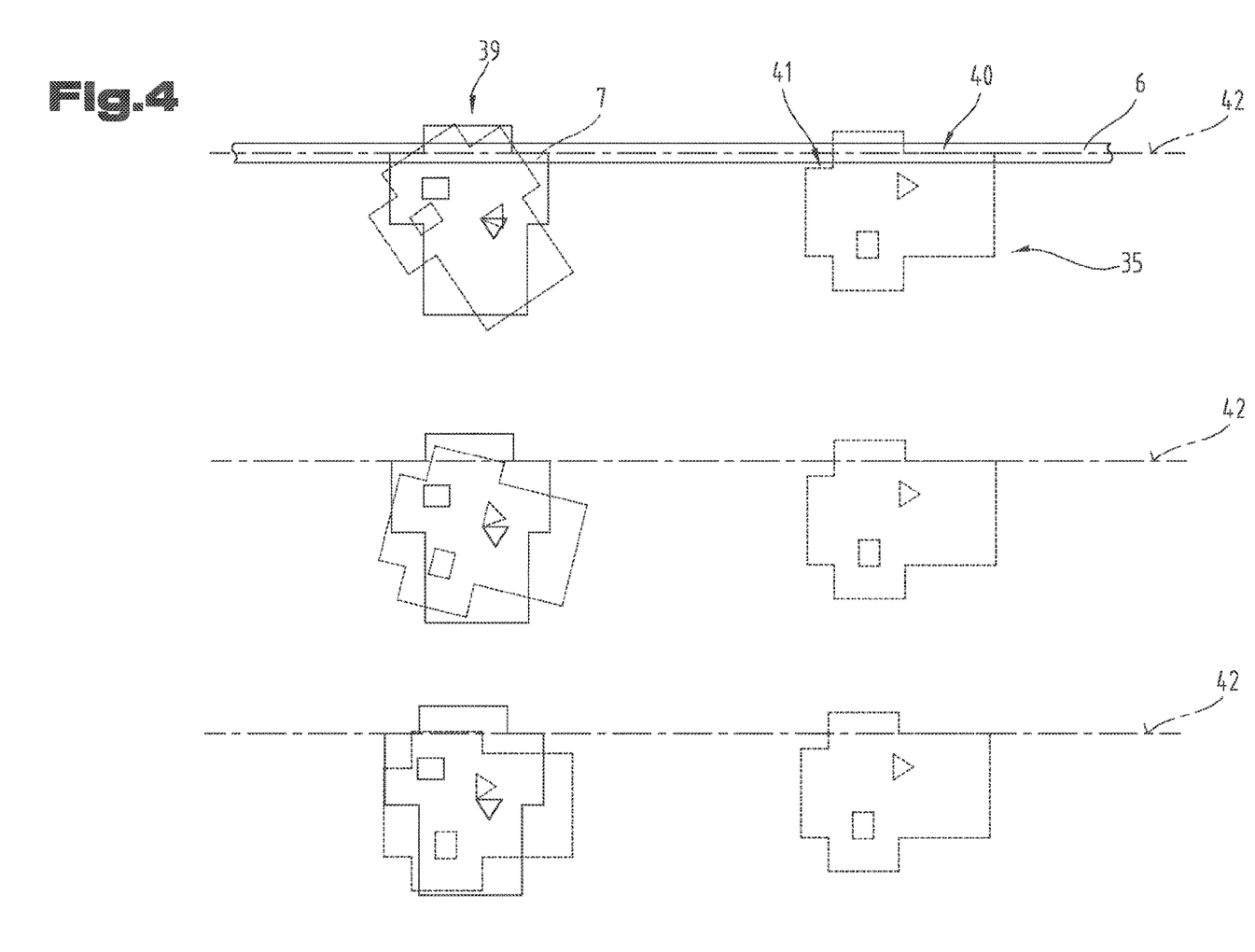
FIG. 4 a representation of a manipulation instruction according to a further possible embodiment.
Figure 9:
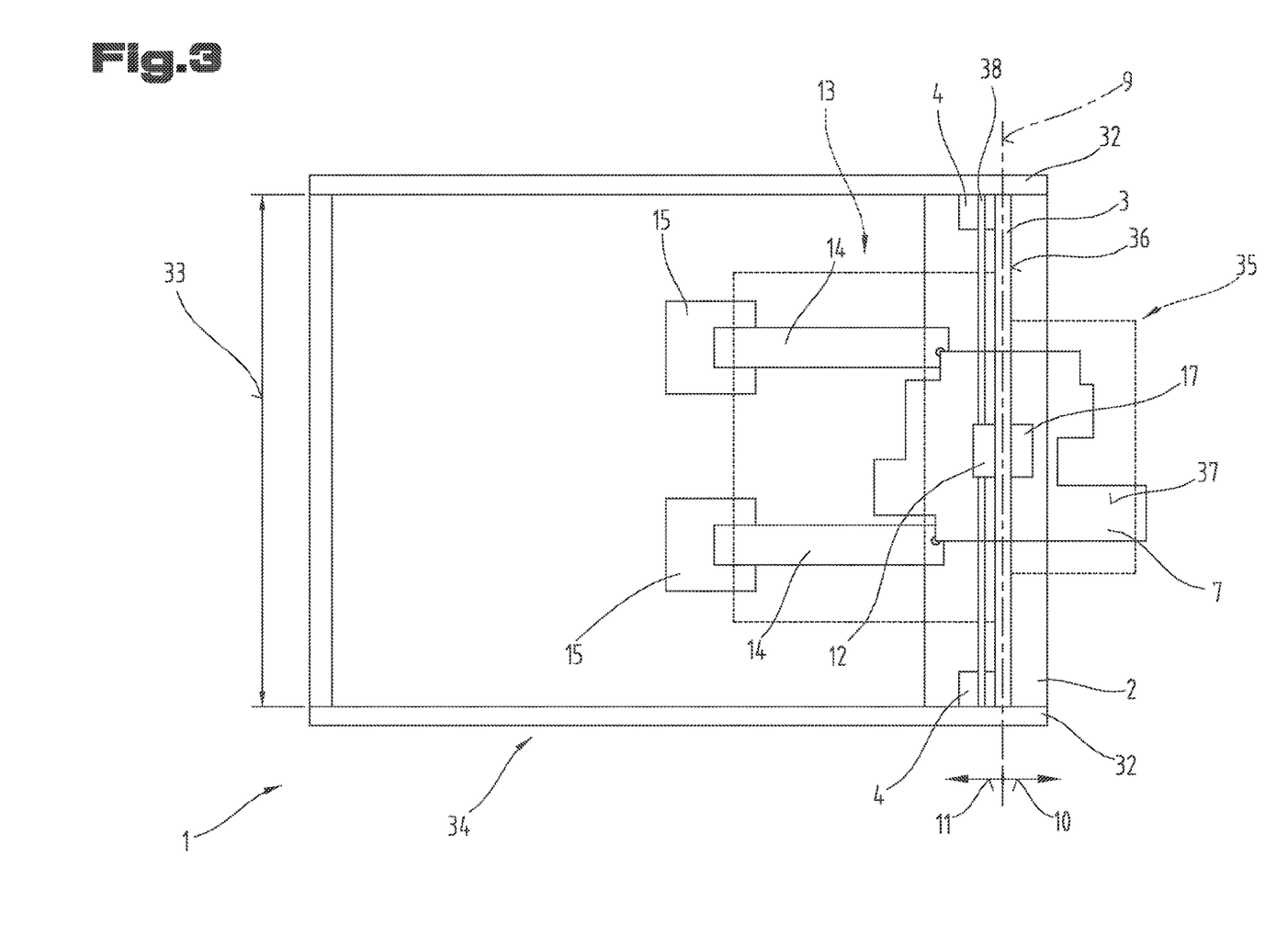

FIG. 4 shows a section of the display region 35, in particular in a top view of the sheet-metal piece 7 to be formed, as the view would essentially also be shown for the machine operator. The metal sheet 7 is shown, which is inserted into the bending machine in a first processing position 39, in particular laid onto the lower tool 6, and as it is supposed to be inserted for the subsequent processing step in the second processing position 40. Furthermore, the bending line 42 is shown, about which the metal sheet 7 was bent in the first processing position 39, and is supposed to be bent in the second processing position 40. The correct reference orientation 41 of the metal sheet in the second processing position 40 is determined by the image processing processor and shown by the display means. According to a further embodiment, it is also possible that the manipulation actions for moving the metal sheet 7 from the first processing position 39 to the second processing position 40 are shown as an animation, so as to be able to show the manipulation steps clearly. In the case shown, the manipulation actions involve a simple 90° rotation to the left. In the case of complex bent workpieces, however, it will also occur that not only rotation but also pivoting is required, and this brings with it the risk of defective manipulation and therefore of a defectively bent sheet-metal piece, in particular in the case of a low unit number, down to a unit number of 1. With this animated step-by-step representation, the machine operator can be given significant support in correct guidance of the metal sheet to the next processing step.

In conclusion, it should be stated that in the different embodiments described, the same parts are provided with the same reference symbols or the same component designations, wherein the disclosures contained in the description as a whole can be applied analogously to the same parts having the same reference symbols or the same component designations. Also, the position information selected in the description, such as at the top, at the bottom, on the side, etc., relates to the figure being directly described and shown, and this position information must be applied analogously to a new position in the case of a change in position.

Further embodiments of the bending machine with a work area image capture apparatus, which might be independent in and of themselves, are shown in FIG. 2-4, wherein once again, the same reference symbols or component designations are used for the same parts as in the preceding FIG. 1. In order to avoid unnecessary repetition, reference is made to the detailed description in the preceding figures, i.e. this is pointed out.

The exemplary embodiments show possible embodiment variants of the bending machine with a work area image capture apparatus, wherein it should be noted at this point that the invention is not restricted to the embodiment variants of the same that are specifically shown, but rather, instead, various combinations of the individual embodiment variants with one another are possible, and this variation possibility lies within the ability of a person skilled in the art and working in this technical field, on the basis of the teaching of the present invention concerning technical action.

Furthermore, individual characteristics or combinations of characteristics of the different exemplary embodiments shown and described can also represent independent inventive solutions or solutions according to the invention, by themselves.

The task underlying the independent inventive solutions can be derived from the description.

All information regarding value ranges in the present description should be understood to mean that these include any and all partial ranges of them; for example, the information 1 to 10 should be understood to mean that all partial ranges, proceeding from the lower limit 1 and also including the upper limit 10 are also included; i.e. all partial ranges start with a lower limit of 1 or more and end at an upper limit of 10 or less, for example 1 to 1.7, or 3.2 to 8.1, or 5.5 to 10.

Above all, the individual embodiments shown in FIG. 2-4 can form the object of independent solutions according to the invention. The tasks and solutions in this regard, according to the invention, can be derived from the detailed descriptions of these figures.

For the sake of good order, it should be pointed out, in conclusion, that for a better understanding of the structure of the bending machine with a work area image capture apparatus, this machine and its components were shown not to scale and/or increased in size and/or reduced in size, in part.

REFERENCE SYMBOL LISTING 1 bending machine
2 machine table
3 press beam
4 drive means
5 machine controller
6 lower tool
7 metal sheet
8 movement direction
9 working plane
10 working and manipulation space
11 machine space
12 image capture apparatus
13 capture region 14 contact finger
15 rear stop
16 image processing processor
17 display means
18 coordinate transformation module
19 position determination system
20 machine operator
21 mobile part
22 first counter-location
23 second counter-location
24 high-frequency communication connection
25 ultrasound signal connection
26 field of vision
27 further image capture apparatus
28 capture region
29 face-finding module
30 vertical distance
31 floor, base surface
32 side parts
33 machine width
34 machine frame
35 display region
36 front side
37 surface, flat side
38 manipulation apparatus
39 first processing position
40 second processing position
41 reference orientation
42 bending line

The invention claimed is:

1. A bending machine (1) with a work area image capture apparatus,
wherein the bending machine (1) has a machine frame (34),
a longitudinally extended machine table (2), fixed in place,
and a longitudinally extended press beam (3), which press beam (3) is guided in the machine frame (34) and held by a drive means (4), so as to be movable relative to the latter, which drive means (4) is controlled by a machine controller (5),
and wherein the machine frame (34) furthermore has two side parts (32), which are spaced apart from one another by a machine width (33) in the direction of the longitudinal expanse of the machine table (2),
and wherein the longitudinal expanse and the movement direction (8) of the press beam (3) define a working plane (9),
and the working plane (9) establishes a front working and manipulation space (10) and a rear machine space (11), which is distinguished from the former and, in particular, closed off,
and wherein an image capture apparatus (12) is disposed in the machine space (11), above the machine table (2), wherein a capture region (13) of the image capture apparatus (12) is oriented in the direction of the machine space (11),
and wherein the image capture apparatus (12) is connected with a display means (17), which is configured for representation of the captured image of the capture region (13),
wherein
the image capture apparatus (12) is connected with a display means (17) by way of an image processing processor (16), and wherein
the image processing processor (16) has a coordinate transformation module (18) that is configured for correction of the perspective of the captured image, and
wherein the coordinate transformation module (18) is connected with a wireless position determination system (19), which is configured for determining the position of a machine operator (20) in the working and manipulation space (10).

2. The bending machine according to claim 1, wherein the image capture apparatus (12) is formed by at least a 2D or a 3D camera.

3. The bending machine according to claim 1, wherein the position determination system (19) has a mobile part (21) carried by the machine operator (20) and a first counter-location (22) disposed on the bending machine (1), wherein a wireless high-frequency communication connection (24) exists between the mobile part (21) and the first counter-location (22), and wherein the bending machine (1) has at least a second counter-location (23), wherein a wireless ultrasound signal connection (25) exists between the mobile part (21) and the at least one second counter-location.

4. The bending machine according to claim 1, wherein the image capture apparatus (12) is disposed in a center section of the longitudinal expanse of the press beam (3) or in the region of at least one of the side parts (32).

5. The bending machine according to claim 1, wherein a graphic model of the bending machine (1) is stored in memory in a memory means of the image processing processor (16) or in an external memory means connected with the image processing processor (16), which model the image processing processor (16) shows on the display means (17), superimposed on the captured image.

6. The bending machine according to claim 1, wherein a further image capture apparatus (27) connected with the image processing processor (16) is disposed in the working and manipulation space (10), which apparatus has a capture region (28) that is oriented relative to the area of the head height of a machine operator (20),
and wherein the further image capture apparatus (27) is connected with the face-finding module (29) of the image processing processor (16).

7. The bending machine according to claim 1, wherein the display means (17) is formed by a projector, wherein the projection region is oriented relative to a front side (36) of the bending machine (1), particularly the press beam (3) or a casing of the press beam (3), or wherein the projection region is oriented relative to a section of the surface (37) of the metal sheet (7) to be formed.

8. The bending machine according to claim 1, wherein the display means (17) is formed by data glasses.

9. The bending machine according to claim 3, wherein the mobile part (21) is formed by the data glasses.

10. The bending machine according to claim 1, wherein the image capture apparatus (12) is disposed on a manipulation apparatus (38) that is configured to change the position of the image capture apparatus (12) parallel to the longitudinal expanse and/or
is configured to pivot the image capture apparatus (12) about a vertical and/or horizontal axis.

11. The bending machine according to claim 1, wherein the wireless position determination system (19) has an acceleration sensor or a recognition mark that can be read in contact-free manner.

12. The bending machine according to claim 1, wherein the display means (17) is formed by a flat screen that is disposed on the press beam (3), in particular on the front side (36).

13. The bending machine according to claim 12, wherein the flat screen is disposed in an installation apparatus, which installation apparatus allows positioning of the flat screen along the longitudinal expanse of the press beam (3).

14. A method for improving the operating safety of the bending machine (1) according to claim 1, wherein
in real time;
a rear image of the machine space (11) is captured by the image capture apparatus (12), and that
the coordinates of a machine operator (20) in the working and manipulation space (10) are determined by the position determination system (19); and wherein
a transformation vector between the image capture apparatus (12) and the coordinates of the machine operator (20) is determined by the coordinate transformation module (18); and wherein
the captured image is transformed, in terms of perspective, by the image processing processor (16), using the transformation vector; and wherein
the transformed image is shown on the display means (17).

15. The method according to claim 14, wherein a front image is captured by the further image capture apparatus, in which front image the face of the operator, in particular the position of the eyes, is determined by the face-finding module (29).

16. The method according to claim 15, wherein a viewing direction vector is determined by the coordinate transformation module (18) from the position of the eyes, which vector is used by the image processing processor (16), together with the transformation vector, for perspective transformation.

17. The method according to claim 15, wherein a vertical distance (30) between floor (31) and eye position is determined by the coordinate transformation module (18), from the position of the eyes and a placement position of the further image capture means, which distance is used by the image processing processor (16) for perspective transformation, together with the transformation vector.

18. The method according to claim 14, wherein the image processing processor (16) shows a reference orientation stored in the memory means or in the external memory Means on the display means (17) and/or on a metal sheet (7) inserted into the bending machine (1).

19. The method according to claim 14, wherein the image processing processor (16) has a pattern recognition module that captures the orientation of an inserted metal sheet (7), in particular the outlines of the metal sheet (7), as the actual orientation in the front and/or rear image, and determines an orientation deviation vector by a comparison with a reference orientation stored in the memory means or in the external memory means, and shows this vector on the display means (17) and/or on the inserted metal sheet (7) as a correction representation.

20. The method according to claim 19, wherein the correction representation is generated by the image processing processor (16) as an animation.

* * * * *